United States Patent
Osman et al.

(10) Patent No.: US 11,627,359 B2
(45) Date of Patent: Apr. 11, 2023

(54) INFLUENCER STREAM CUSTOMIZATION FOR FOLLOWER VIEWERS

(71) Applicant: Sony Interactive Entertainment Inc., Tokyo (JP)

(72) Inventors: Steven Osman, San Mateo, CA (US); Katrine K. Chow, San Mateo, CA (US); Saket Kumar, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/378,600

(22) Filed: Jul. 16, 2021

(65) Prior Publication Data

US 2022/0021921 A1 Jan. 20, 2022

Related U.S. Application Data

(60) Provisional application No. 63/052,902, filed on Jul. 16, 2020.

(51) Int. Cl.
*H04N 21/266* (2011.01)
*H04N 21/2668* (2011.01)
(Continued)

(52) U.S. Cl.
CPC ......... *H04N 21/2668* (2013.01); *G06T 7/246* (2017.01); *G06T 7/50* (2017.01);
(Continued)

(58) Field of Classification Search
CPC ......... H04N 21/2668; H04N 21/25891; H04N 21/2743; H04N 21/4316; H04N 21/4781;
(Continued)

(56) References Cited

U.S. PATENT DOCUMENTS 9,078,048 B1  7/2015 Gargi et al.
9,420,353 B1  8/2016 Gargi et al.
(Continued)

OTHER PUBLICATIONS

PCT/US2021/037962, Notification of Transmittal of the International Search Report and the Written Opinion of the International Searching Authority, or the Declaration, PCT/ISA/220, and the International Search Report, PCT/ISA/210, dated Oct. 18, 2021.

*Primary Examiner* — Jefferey F Harold
*Assistant Examiner* — Timothy R Newlin
(74) *Attorney, Agent, or Firm* — Penilla IP, APC

(57) ABSTRACT

Methods and systems are provided for generating a video stream for followers of an influencer during a session. The method includes capturing video images of an environment of the influencer, wherein the environment includes the influencer viewing an online content channel. The method includes detecting surface parameters in the environment and processing the surface parameters to identify three-dimensional features associated with the surface parameter. The method includes identifying a follower that is viewing the influencer. The method includes generating an overlay image for at least one of the surface parameters, the overlay image is configured for dynamic contouring to the identified three-dimensional features during the session. The overlay image is selected based on a profile of the follower so that the video stream received by the follower when viewing the influencer is customized based on the profile of the follower.

19 Claims, 10 Drawing Sheets

(51) Int. Cl.
  *G06T 7/50* (2017.01)
  *G06T 7/246* (2017.01)
  *G06T 15/10* (2011.01)
  *G06T 15/50* (2011.01)
  *G06T 17/20* (2006.01)
  *H04N 5/272* (2006.01)

(52) U.S. Cl.
  CPC .............. *G06T 15/10* (2013.01); *G06T 15/50* (2013.01); *G06T 17/20* (2013.01); *H04N 5/272* (2013.01); *G06T 2207/10016* (2013.01)

(58) Field of Classification Search
  CPC ...... H04N 21/812; H04N 5/272; G06T 7/246; G06T 7/50; G06T 15/10; G06T 15/50; G06T 2207/10016; G06Q 30/0269; G11B 27/036; G11B 27/28
  See application file for complete search history.

(56) References Cited

U.S. PATENT DOCUMENTS

| | | | |
|---|---|---|---|
| 10,699,488 B1 * | 6/2020 | Terrano | G06N 20/00 |
| 11,102,452 B1 * | 8/2021 | Nugumanov | G06T 13/205 |
| 2005/0166224 A1 * | 7/2005 | Ficco | H04N 21/242 |
| | | | 725/35 |
| 2007/0226761 A1 * | 9/2007 | Zalewski | H04N 21/478 |
| | | | 725/35 |
| 2010/0122286 A1 * | 5/2010 | Begeja | G06Q 30/02 |
| | | | 725/34 |
| 2014/0040944 A1 | 2/2014 | Zalewski et al. | |
| 2014/0189013 A1 * | 7/2014 | Abhyanker | G06Q 50/01 |
| | | | 709/204 |
| 2014/0298363 A1 | 10/2014 | Begeja et al. | |
| 2016/0277802 A1 * | 9/2016 | Bernstein | H04N 21/4325 |
| 2017/0011554 A1 * | 1/2017 | Burba | G06T 15/20 |
| 2017/0316606 A1 * | 11/2017 | Khalid | G06T 17/00 |
| 2018/0061456 A1 * | 3/2018 | Martinez | G11B 27/34 |
| 2018/0300942 A1 * | 10/2018 | Eskander | G06T 15/205 |
| 2018/0349946 A1 * | 12/2018 | Nguyen | G06Q 30/0244 |
| 2019/0325498 A1 * | 10/2019 | Clark | G06Q 30/0625 |
| 2020/0059633 A1 * | 2/2020 | Comradd | G06T 7/50 |
| 2020/0294311 A1 * | 9/2020 | Holz | G06T 19/003 |
| 2020/0298113 A1 * | 9/2020 | Smithers | H04N 21/4312 |
| 2020/0298118 A1 * | 9/2020 | Yannakakis | G06N 3/08 |
| 2020/0302664 A1 * | 9/2020 | Lee | G06T 15/503 |
| 2021/0004630 A1 * | 1/2021 | Uscinski | G06T 7/187 |
| 2021/0037267 A1 * | 2/2021 | Shore | H04N 21/2187 |
| 2021/0056750 A1 * | 2/2021 | Rowley | G06T 7/73 |

* cited by examiner

INFLUENCER STREAM CUSTOMIZATION FOR FOLLOWER VIEWERS

CLAIM OF PRIORITY

This application claims priority under 35 U.S.C. 119(e) to U.S. Provisional Patent Application No. 63/052,902, filed Jul. 16, 2020, entitled "INFLUENCER STREAM CUSTOMIZATION FOR FOLLOWER VIEWERS," the disclosure of which is incorporated herein by reference in its entirety for all purposes.

BACKGROUND

1. Field of the Disclosure

The present disclosure relates generally to video streams, and more particularly to methods and systems for generating a customized video stream for followers of an influencer during a session.

2. Description of the Related Art

Digital marketing has seen many changes over the years with the growth of social media. In particular, influencer marketing which involves endorsements and product placement by influencers (e.g., people and organizations who have a purported expert level of knowledge or social influence in their field) have risen in popularity over the years. To this end, influencers have been seeking ways to develop sophisticated operations that would enhance consumer engagement which in turn can help generate more revenue for influencers and their sponsors.

A growing trend in digital marketing is the growth of influencer marketing which involves businesses collaborating with influencers to endorse their product, services, brand, etc. Generally, influencers are paid to endorse a product, service, brand, etc., however, the amount they are paid are based on several factors. These factors may include the total number of followers the influencer has, the amount of engagement their social media post garner from their followers, the number of social media posts and frequency of the social media posts, etc. Unfortunately, many followers of the influencer are uninterested in the products and services the influencer endorses. For example, a viewer that is viewing the influencer's social media channel may be interested in fitness and living a healthy lifestyle. While viewing the influencer's channel, if the influencer endorses products that the viewer does not have an interest in (e.g., fast food, junk food, etc.), the viewer may stop viewing the influencer's social media channel. The influencer may run the risk of the viewer being disengaged from the influencer's channel because they dislike the product that is being promoted by the influencer. As a result, this may lead to the viewer and other followers from unsubscribing from the influencer's channel which can lead to a decrease in revenue for the influencer.

It is in this context that implementations of the disclosure arise.

SUMMARY

Implementations of the present disclosure include devices, methods and systems relating to generating a customized video stream for followers of an influencer. In some embodiments, followers can connect to a channel of an influencer to view content created by an influencer. In one embodiment, a plurality of cameras can be used to record the influencer and an environment of the influencer while the influencer creates content for their channel. The influencer channel may be include various types of content. In one example, the content may be a recording (e.g., live or rebroadcast) that shows the influencer watching and reacting to a content channel of a player. In some embodiments, various surfaces on real-world objects in the environment of the influencer can be identified and designated as markers. Using the markers as a target location, an overlay image (e.g., advertisements, sponsorships, logos, etc.) can be generated onto a surface area of the markers. In some embodiments, the overlay images can be selected based on a profile of the follower which results in a customized video stream for each follower.

In one embodiment, method for generating a video stream for followers of an influencer during a session is disclosed. In this embodiment, the method capturing video images of an environment of the influencer, wherein the environment includes the influencer viewing an online content channel. The method includes detecting surface parameters in the environment and processing the surface parameters to identify three-dimensional features associated with the surface parameter. The method includes identifying a follower that is viewing the influencer. The method includes generating an overlay image for at least one of the surface parameters, the overlay image is configured for dynamic contouring to the identified three-dimensional features during the session. The overlay image is selected based on a profile of the follower so that the video stream received by the follower when viewing the influencer is customized based on the profile of the follower.

In another embodiment, a method for generating a video stream for followers of an influencer during a session is disclosed. The method includes capturing video images of an environment of the influencer. The environment includes the influencer viewing an online content channel. The method includes detecting surface parameters in the environment and processing the surface parameters to identify three-dimensional features associated with the surface parameters. The method includes identifying a plurality of followers that are viewing the influencer. The method includes generating an overlay image for at least one of the surface parameters. The overlay is selected based on information identified in profiles of the plurality of followers. The video stream received by the followers is customized during the session.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 3B-1-3D-2 illustrate an embodiment of an overlay image that has been generated onto the shirt of an influencer with the arm position of the influencer at different positions, in accordance with an implementation of the disclosure.

DETAILED DESCRIPTION

Figure 1A:
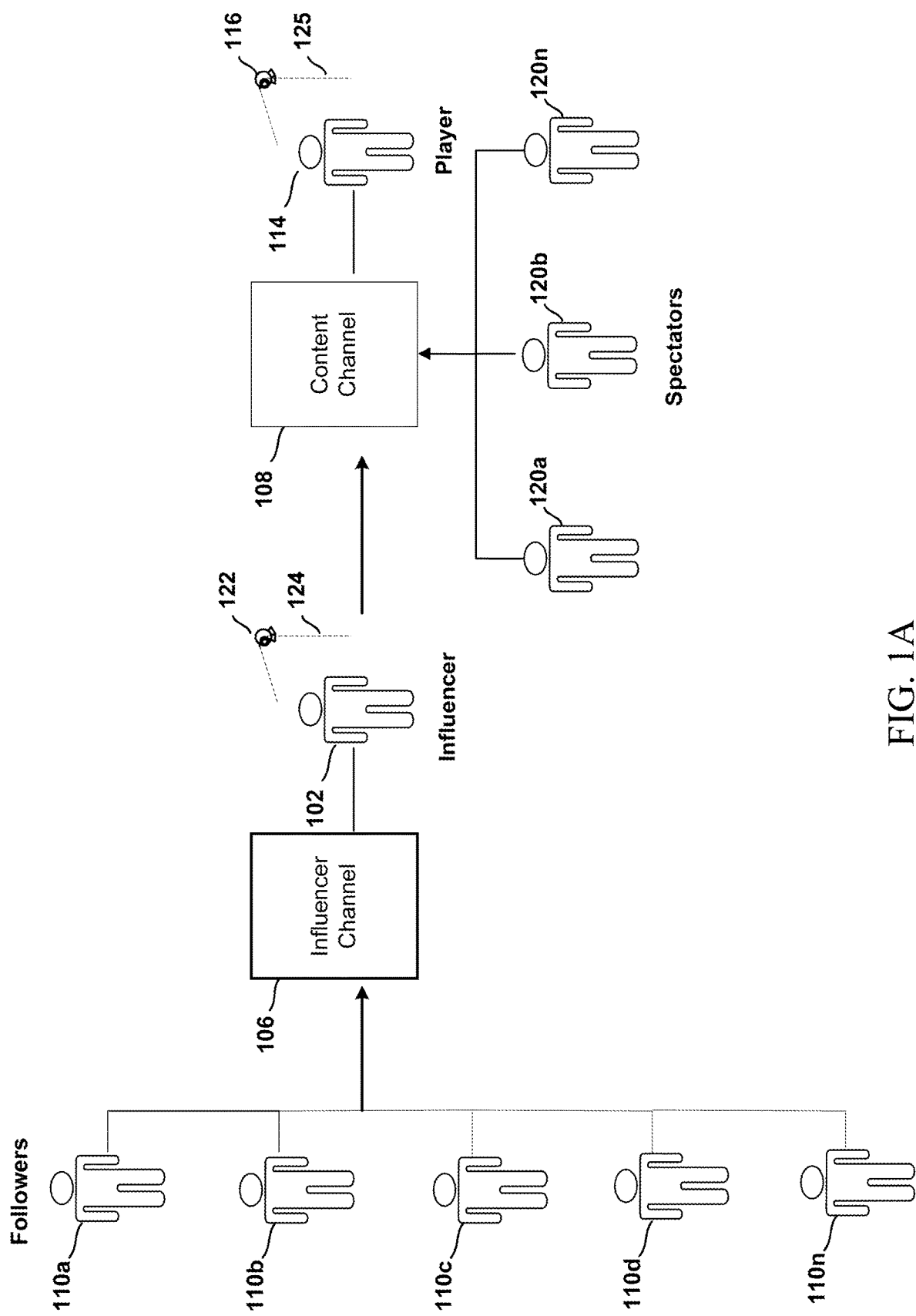
FIG. 1A is an embodiment illustrating an influencer and a plurality of spectators connected to a content channel of a player, and a plurality of followers connected an influencer channel, in accordance with an implementation of the disclosure.

The following implementations of the present disclosure provide devices, methods, and systems for generating a customized video stream for followers of an influencer during a session. In particular, the present disclosure provides followers of an influencer with a customized video stream that includes a plurality of overlay images (e.g., advertisements, sponsorships, logos, etc.) that are generated on various surfaces of the influencer's environment. The overlay images may be selected based on the interest of the followers, which in turn can help enhance follower engagement and generate greater revenue for the influencer.

In one embodiment, the method a method is disclosed that enables generating a customized video stream for followers of an influencer. The method includes capturing video images of an environment of the influencer and detecting surface parameters in the environment of the influencer. In one embodiment, the method includes processing the surface parameters to identify three-dimensional features associated with the surface parameters. In still other embodiments, the method further includes generating an overlay image for at least one of the surface parameters detected in the environment of the influencer. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a plurality of followers can connect to a channel of the influencer over a network to view content (e.g., video, audio, photos, etc.) created by the influencer. In one example, the influencer may create content that includes a recording of the influencer viewing a content channel of a player which shows the player competing in a live gaming event (e.g., E-sports event). While viewing the player competing in the event, the influencer may provide a play-by-play commentary of what is occurring in the live gaming event. Accordingly, when the followers are connected to view content on the influencer's channel, the followers may have a view of the live gaming event, a view of the influencer watching the live gaming event, and an audio feed of the influencer's play-by-play commentary of the live gaming event. In some embodiments, a plurality of spectators can connect to the content channel of the player to view content created by the player. Accordingly, in some embodiments, the influencer and the spectators can view the player's content by connecting directly to the content channel of the player, whereas the followers can view the player's content by connecting to the channel of the influencer.

In accordance with another embodiment, when the followers are connected to view content on the influencer channel, the content being viewed may include content such as video content that provides a view into the environment of the influencer. In some embodiments, the environment of the influencer (e.g., bedroom, recording studio, internet café, public location, etc.) may include various objects and audio-visual equipment that the influencer can use to record content for their channel In accordance with one embodiment, markers may be physically anchored to or embedded in real-world objects. For example, markers can be physically anchored onto clothing worn by the influencer and/or various real-world objects (e.g., bookshelf, picture frame, cabinet, etc.) in the environment of the influencer. In some embodiments, the markers do not need to be physically anchored on the real-world objects. Instead, the marker can be a virtual marker that has visually distinguishable points such as a button on a shirt, sleeve on a shirt, edge on a bookshelf, corner on a picture frame, etc. In some embodiments, a surface area where the markers are located has a plurality of surface parameters associated with the surface area. These parameters may include 3-dimensional surface contours, wrinkles, folds, creases, shading, occlusions, textures, curvature, shadowing, etc.

In accordance with another embodiment an overlay image can be generated onto a location associated with the surface area of an object. The overlay image may include a variety of images such as a sponsorship logo, an advertisement, a symbol identifying products or services of a company, etc. In some embodiments, the specific overlay images generated onto the surface area of the object can be selected based on the interest and preferences of the followers. As noted, the surface area of an object may include a plurality of surface parameters such as 3-dimensional surface contours, wrinkles, folds, creases, shading, occlusions, textures, curvature, shadowing, etc. When the overlay image is generated onto a surface of an object, the overlay image may appear as if it is integrated onto the surface area of the object (e.g., shirt, bookshelf, closet, etc.). In other words, the overlay image may also include the surface parameters associated with surface of the object. For example, a shirt of an influencer includes several wrinkles, folds, and shading. When an overlay image of a "Batman" logo is overlaid onto the surface area of the shirt, the Batman logo may also include similar wrinkles, folds, and shading on its surface.

With the above overview in mind, the following provides several example figures to facilitate understanding of the example embodiments.

FIG. 1A is an embodiment illustrating an influencer 102 and a plurality of spectators 120 connected to a content channel 108 of a player 114, and a plurality of followers 110 connected an influencer channel 106. As shown, FIG. 1A illustrates a plurality of followers 110a-110n connected to the influencer channel 106 to view content of the influencer 102. In one embodiment, the content created by the influencer 102 provides a view into an environment of the influencer 102 that is captured by camera 122 which has a camera POV 124. For example, the influencer 102 may create content that includes a recording of the influence 102 candidly talking about a new PlayStation video game that was recently released. The camera 122 is used to record the influencer 102 in the environment (e.g., bedroom) of the influencer while the influencer talks about the new video game. In another embodiment, the influencer 102 is connected to content channel 108 so that the influencer 102 can view content created by a player 114. In some embodiments, the content channel 108 includes a recording of the player 114 that is captured by camera 116 with a camera POV 125. In yet another embodiment, a plurality of spectators 120 are connected to the content channel 108 to view content created by the player 114.

In some embodiments, the plurality of followers 110 are connected to the influencer channel 106 to view content provided by the influencer 102. In one embodiment, the plurality of followers 110 are those who follow or subscribe to the influencer channel 106 because they are interested in the content that the influencer 102 creates and makes available via the influencer channel 106. In one example, an influencer 102 may be a famous pop singer who has a large fan base. Each week, when the pop singer creates and releases a new video content on the influencer channel 106, the followers 110 are notified that new content is available for viewing. In some embodiments, the influencer channel 106 may include content that is available for live-viewing and/or content that has been rebroadcasted and available for viewing at any desired time.

In some embodiments, the influencer 102 creates various content and makes it available for viewing on the influencer channel 106. The influencer 102 may be a person who has a substantial following on a video platform and/or social media platform (e.g., Sony, YouTube, Instagram, Twitter, Facebook, etc.) The influencer 102 can set trends and provide their followers 110 with their opinion on various services, products, brands, etc. to help companies market their services and products. In some embodiments the influencer 102 may be a professional gamer, a performing artist, a visual artist, an athlete, an industry expert, or person that is well respected and have specialized knowledge in the particular niche or industry. In some embodiments, the content created by the influencer 102 may be captured by the camera 122. For example, the influencer 102 may be a person well versed in the video game industry and is known for reviewing and providing commentary on horror video games. The camera 122 can be used to help the influencer 122 create content for the influencer channel 106. For example, the camera 122 can be used to record the influencer 102 previewing and critiquing a new horror video game has just been released. In some embodiments, the influencer 102 can make edits to the recorded video content to enhance the content (e.g., adding background music, sound effects, graphics, images, etc.) and/or customize it to make it more appealing to their followers 110. In one embodiment, the content created by the influencer 102 can be a video recording, an audio recording, images, or any combination thereof.

In some embodiments, the influencer 102 can connect to the content channel 108 to view content created by the player 114. The content channel 108 of the player 114 may include various types of content created by the player 114 such as a video recording, an audio recording, images, or any combination thereof. In some embodiments, the camera 116 is used to record the player 114 performing various activities, e.g., playing a video game, endorsing a product, etc. The recorded video can be used as content and viewed on the content channel 108. In some embodiments, a plurality of spectators 120a-120n can connect to the content channel 108 to view content created by the player 114. As illustrated in FIG. 1A, in one embodiment, the influencer 102 and the spectators 120 can view the content of the player 114 by connecting directly to the content channel 108, whereas the followers 110 can view the player's content by connecting to the influencer channel 106.

Figure 1B:
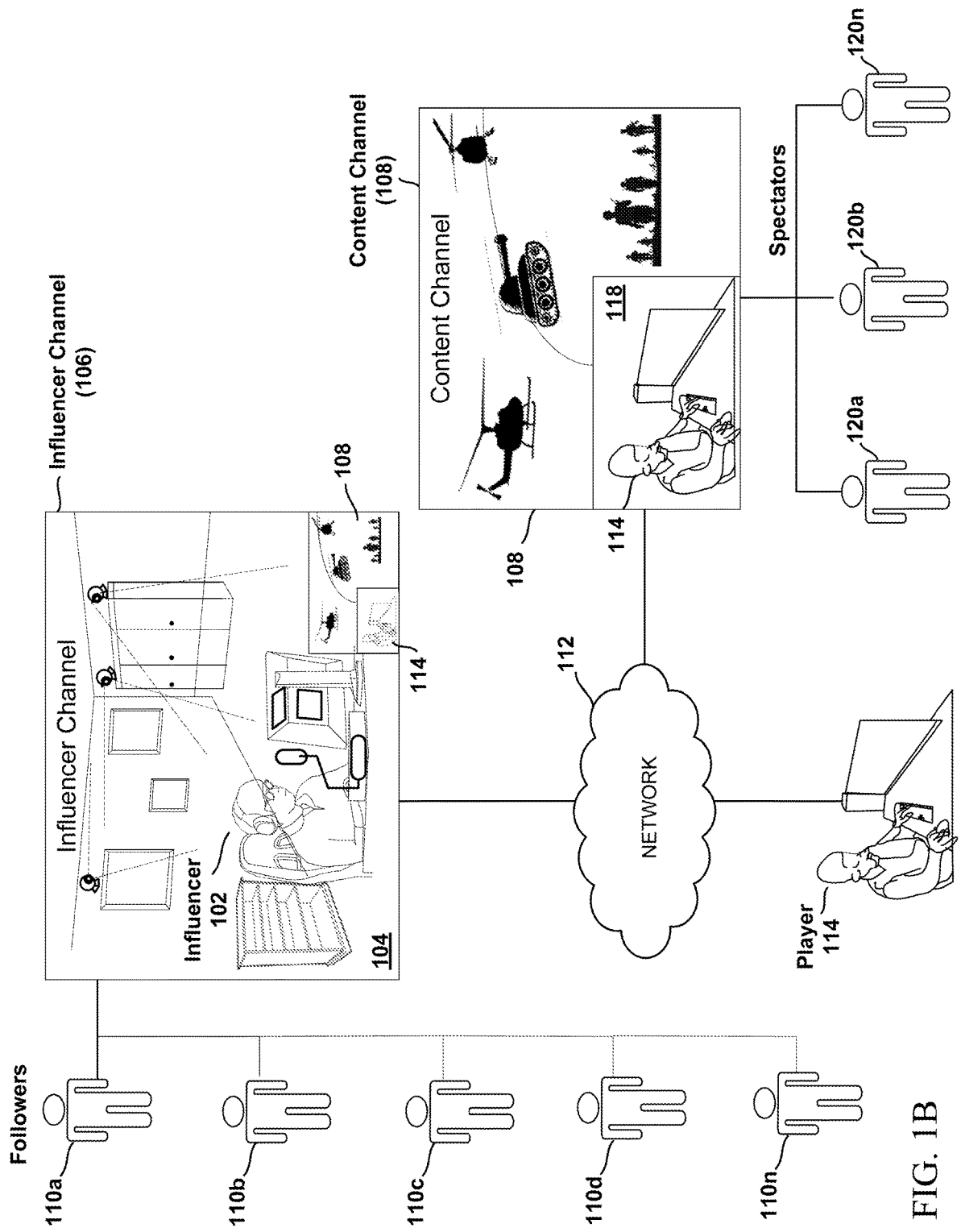
FIG. 1B is an embodiment illustrating a plurality of followers connected to an influencer channel to view a video recording of an influencer watching and commentating on a gameplay of a player, in accordance with an implementation of the disclosure.

FIG. 1B is an embodiment illustrating a plurality of followers 110a-110n connected to an influencer channel 106 to view a video recording of an influencer 102 watching and commentating on a gameplay of a player 114. As shown, the embodiment includes followers 110a-110n, influencer channel 106, player 114, content channel 108, spectators 120a-120n. In one embodiment, the followers 110a-110n are connected to the influencer channel 106 through a network 112 and can view content associated with the influencer 102 via the influencer channel 106. As noted above, the plurality of followers 110 may subscribe to the influencer channel 106 and view content that the influencer 102 releases and makes available through the influencer channel 106. In some embodiments, the followers 110 are connected to the influencer channel 106 because of their interest in the content that the influencer 102 creates or because of their interest in the influencer's 102 character irrespective of the subject matter of the content. For example, the influencer 102 may be a comedian that has a likeable personality who many people find enjoyable to watch. If the comedian creates content related to a new action movie that was recently released, although some followers may not be interested in the new action move, the content may still be appealing to the followers because the followers finds the influencer entertaining to watch.

In one embodiment, various content (e.g., video, audio, photos, etc.) created by the influencer 102 can be viewed on the influencer channel 106. In one example, the influencer channel 106 includes video content that is available for live-viewing and/or rebroadcasted and available for viewing at any desired time. The type of content created by the influencer 102 may depend on what the influencer 102 creates and shares with the followers 110. For example, the influencer 102 may create "reaction videos" which includes a recording of the influencer 102 viewing media content that they have never seen before. To further illustrate this example, as shown in FIG. 1B, the influencer 102 is connected to the content channel 108 to view the content available through the content channel 108 of the player. As illustrated, the influencer 102 is shown watching the player 114 playing a video game. Various audiovisual equipment (e.g., microphone and cameras) that located are located in the environment 104 of the influencer 102 are configured to record the influencer 102 while the influencer 102 views the gameplay and reacts to what is occurring the gameplay.

In other embodiments, the spectators 120a-120n can connect to the content channel 108 over network 112 to view the content of the player 114. As illustrated in the FIG. 1B, the content channel 108 may include a recording of the player 114 playing a game involving soldiers in war battle.

As noted above, the influencer 102 and the spectators 120 can both connect directly to the content channel 108 to view the gameplay of the player 114. However, in some embodiments, the followers 110 can view the gameplay of the player 114 by connecting and viewing it through the influencer channel 106.

Figure 2:
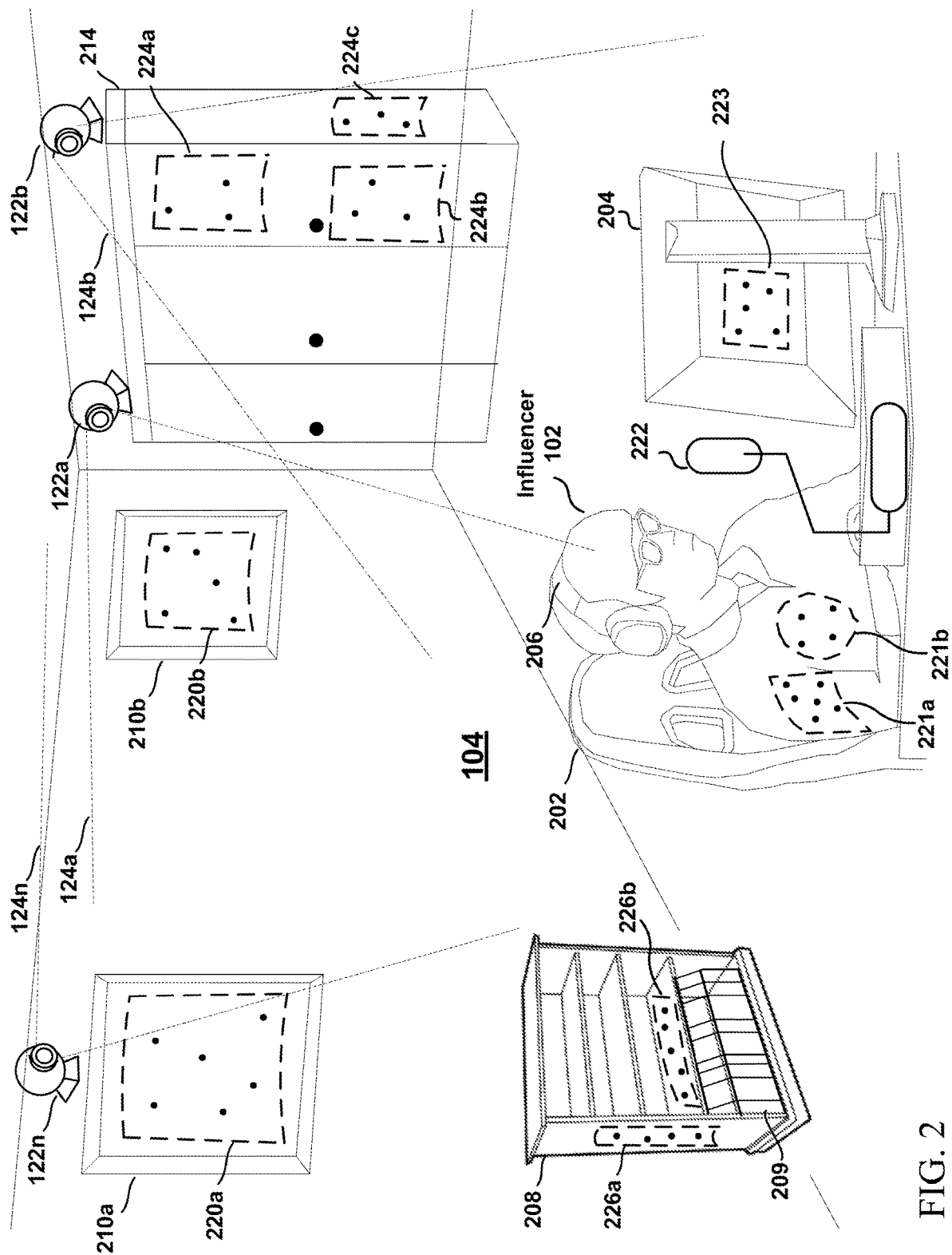
FIG. 2 illustrates an embodiment of an environment 104 of an influencer and a plurality of surfaces identified and designated as markers, in accordance with an implementation of the disclosure.

FIG. 2 illustrates an embodiment of an environment 104 of an influencer 102 and a plurality of surfaces identified and designated as markers. In one embodiment, the system may designate various surfaces and content (e.g., picture in picture frame) associated with objects in the environment 104 of the influencer 102 as markers so that overlay images can be overlaid onto the marker location. In one example, various surfaces on objects such as clothing worn by the influencer and furniture located in the environment 104 can be designated as markers (e.g., 220a-220b, 221a-221b, 223, 224a-224c, 226a-226b). These marker locations can then be used to overlay various overlay images to generate a video stream for a follower. In some embodiments, the markers may be physically anchored on various real-world objects in the environment 104 of the influencer 102. The markers can be encoded with data and can been used to convey a position of the markers in relation to the camera 122.

In some embodiments, the environment 104 is the physical location where the influencer 102 creates and records the content that the influencer shares on the influencer channel 106. The environment 104 can be any physical location such as a bedroom, recording studio, internet café, public location, etc. As illustrated in FIG. 2, the influencer 102 is shown sitting at a desk wearing headphones 206 while viewing content on a computer monitor 204. When creating content for the influencer channel 106, the microphone 222 and the cameras 122a-122n can be used to record the influencer 102. The environment 104 of the influencer may include various real-world objects such as a chair 202, a bookshelf 208, picture frames 210a-210b, and a closet 214. For example, as illustrated in the FIG. 2, a plurality of surfaces in the environment 104 of the influencer 102 are identified and designated as markers. Markers 221a-221b are located on the surface of the influencer's shirt (e.g., sleeve and front, respectfully). Marker 223 is located on a surface of computer monitor 204. Markers 226a-226b are located on the surfaces of the bookshelf 208 (e.g., side and shelf, respectfully). Markers 220a-202b are located on the surfaces of the picture frames 210a-210b where the content is located, respectfully. Markers 224a-224c are located on the surfaces of the closet 214 (e.g., upper front, lower front, and side, respectfully).

In some embodiments, markers can be anything as long it has enough unique and distinguishable points such as edges, corners, and buttons on a shirt, etc. In one example, the buttons and collar of a shirt that the influencer 102 is wearing may be suitable markers because they include unique distinguishable visual points. In another example, the corners and edges of the picture frames 210a-210b may also be suitable markers since the corners and edges of picture frames are unique and distinguishable points. In some embodiments, a surface area associated with the location of a marker may include plurality of surface parameters that characterizes the surface area. These surface parameters may include various associated three-dimensional features such as surface contours, wrinkles, folds, creases, shading, occlusions, textures, curvature, shadowing, etc. For example, the influencer's shirt may have various wrinkles, folds, and creases at various areas on the shirt. The sleeve of the shirt may have more wrinkles, folds, and creases than the front of the shirt because the sleeve of the shirt is more susceptible to movement (e.g., bending of the arms) compared to the front of the shirt. Accordingly, in one example, the surface area associated with the location of marker 221a (e.g., sleeve of shirt) may have different surface parameters than the surface area associated with the location of marker 221b (e.g., front of shirt).

In accordance with another embodiment, the cameras 122a-122n can be placed at various locations in the environment 104 of the influencer 102 and can be configured record the influencer 102 and any objects within its point of view (POV). Each camera is positioned at a different location within the environment 104 which captures a unique view of the environment 104. Each camera 122 includes an associated camera point of view POV 124a-124n that captures any objects within its POV. For example, as shown in FIG. 2, camera 122a is positioned above the closet 214 and the corresponding camera POV 124a captures the bookshelf 208, picture frames 210a-210b, and a partial view of the influencer 102. Camera 122b is positioned above the closet 214 and the corresponding camera POV 124b captures the influencer 102 and a partial view of the bookshelf 208. Camera 122n is positioned above picture frame 210a and the corresponding camera POV 124n captures the influencer 102, the closet 214, picture frame 210b, and a partial view of the picture frame 210a.

In some embodiments, the cameras 122a-122n may be configured to recognize, track and process the markers. The cameras 122a-122n can be mounted on a 3-axis gimbal that allows the camera to rotate freely about any axis to enable the capturing of various angles of the influencer 102. In one embodiment, the cameras 122a-122n may be a pan-tilt-zoom camera which can be configured to automatically zoom in and track the body movement of the influencer and the various markers in the environment 104. In one example, the influencer 102 may be viewing a music video on the content channel 108 and is fully immersed in the content. While watching the music video, the influencer 102 may not realize that the influencer is dancing and moving around. As the influencer 102 makes various movements while watching the music video, the cameras 122a-122n can track the location of the influencer along with the markers 221a-221b on the influencer's shirt.

Figure 3A:
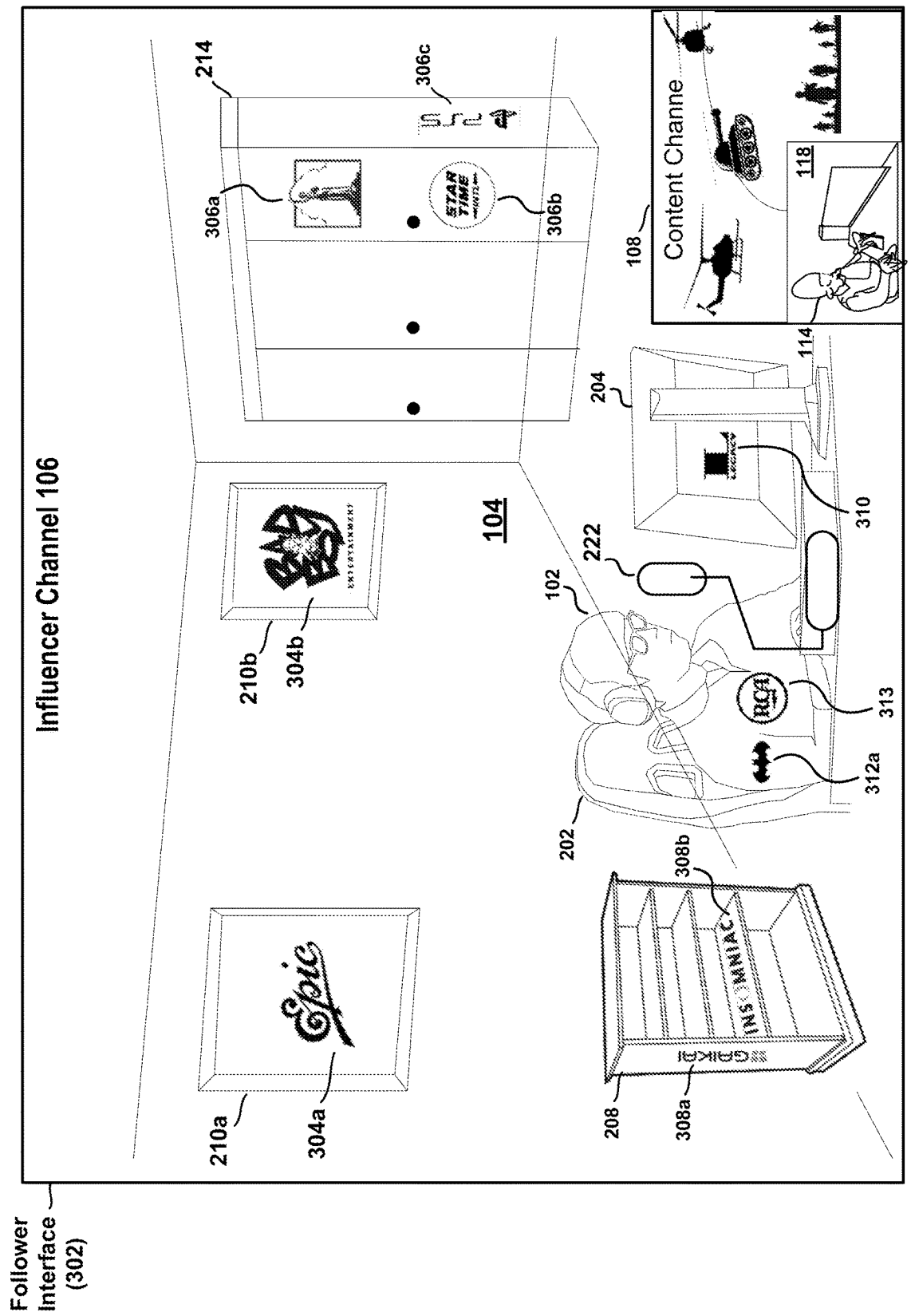
FIG. 3A is an embodiment illustrating a follower interface which shows the environment of the influencer after generating overlay images for the surface parameters associated with the location of the markers, in accordance with an implementation of the disclosure.

FIG. 3A is an embodiment illustrating a follower interface 302 which shows the environment 104 of the influencer 102 after generating overlay images for the surface parameters associated with the location of the markers. The follower interface provides a view from the perspective of the follower 110 when the follower 110 is connected to the influencer channel 106. In the illustrated embodiment, FIG. 3A shows an exemplary video content that the influencer 102 created for the followers 110 to view on the influencer channel 106. As shown, the influencer's content includes the influencer 102 viewing the content channel 108 and commentating on what is occurring in the content channel 108. For example, in some embodiments, the content channel 108 may be a recording (e.g., live or rebroadcast) of a player 114 competing in an E-sports event. While the player 114 is competing in the E-sports event, the influencer 102 can provide commentary and analyze the sequence of events occurring in the event. Accordingly, as shown in FIG. 3A, the follower interface 302 includes a view of the influencer 102 in their environment 104 combined with a view into the content channel 108 of the player 114.

As further illustrated in FIG. 3A, in one embodiment, various overlay images can be overlaid onto a location associated with a surface area of the marker. This provides the followers 110 with a customized video stream since the selected overlay images can be based on the interest and preferences of the followers 110. In accordance with one embodiment, an Artificial Intelligence (AI) Module is configured to receive data from the influencer channel 106 and data associated with a profile of the follower 110 to determine which overlay images to generate for a particular follower 110. The follower profile can include various attributes associated with the follower 110 such as the follower's interests, preferences, likes, dislikes, gaming experience and skill level, etc. The AI module implements one or more machine learning operations that ingest the follower profile and the data from the influencer channel 106 as inputs. The data from the influencer channel 106 can provide the AI module with the context of what the followers are viewing on the influencer channel 106 such as the type of content and the subject matter of the content.

In one example, the AI Module may determine that a follower 110 is connected to the influencer channel 106 and watching a video of an influencer 102 reacting to an action movie. Based on the profile of the follower 110, the AI module knows that the follower 110 is interested in comic books and video games. Accordingly, the AI module may select overlay images that includes advertisements related to new "batman" movie that will be released in the upcoming weeks. As a result, generating overlay images that may align with the interest and preferences of the followers 110 may result in an increase in follower engagement and can lead to higher revenue for the influencer 102.

In some embodiments, the system may identify additional followers during a session as each additional follower connects to the influencer channel 106 to join the session to view content on the influencer channel 106. In one embodiment, for each additional follower, the system may generate an additional overlay image that is dynamically contoured to the identified three-dimensional features associated with a marker location during the session. In some embodiments, for each additional follower, the overlay image is based on the respective profile of the additional follower which results in a customized video stream for each additional follower. Accordingly, when viewing the influencer channel 106, each additional follower may receive a video stream that is different from each other since the overlay images are different for each follower and is selected based on the profile of the follower. In another embodiment, when one or more additional followers are identified, the overlay image that is selected is additionally based on a combination of the profile of the follower and profiles of the one or more additional followers such that each of the follower and the additional followers receives the overlay image in the video stream. Instead of each follower have a different overlay image, the followers may have the same overlay image when they are connected to view content on the influencer channel 106. Accordingly, in this embodiment, the video stream and the overlay image are customized for a group that includes the follower and the one or more additional followers.

As further illustrated in the FIG. 3A, the figure shows a plurality of overlay images generated onto the shirt of the influencer 102 and various objects in the environment 104. In particular, overlay images representing "batman" (e.g., 312*a*) and "RCA Records" (e.g., 313) are dynamically contoured onto the three-dimensional features of shirt of the influencer 102 where markers 221*a*-121*b* are located, respectfully. An overlay image representing "Legacy Recordings" (e.g., 310) is dynamically contoured onto the three-dimensional features of the rear surface of the computer monitor 204 where marker 223 is located. Overlay images representing "Gaikai" (e.g., 308*a*) and "Insomniac Games, Inc." (e.g., 308*b*) are dynamically contoured onto the three-dimensional features of the bookshelf 208 where markers 226*a*-226*b* are located. Overlay images representing "Epic Records" and "Bad Boy Records" are dynamically contoured onto the three-dimensional features of the picture frames 210*a*-210*b* where markers 220*a*-220*b* are located, respectively. Furthermore, overlay images representing "Columbia Pictures Industries," "Startime International" and "PlayStation 5" are dynamically contoured onto the three-dimensional features of the surfaces of the closet 214 where markers 224*a*-224*c* are located, respectively.

FIGS. 3B-1-3D-2 illustrate an embodiment of an overlay image that has been generated onto the shirt of an influencer with the arm position of the influencer at different positions. In particular, FIGS. 3B-1-3D-2 illustrate an overlay image representing "batman" (e.g., 312*b*-312*c*) as an example. In some embodiments, the surface area associated with the shirt of the influencer 102 may include various surface parameters. The surface parameters may include various associated three-dimensional features such as surface contours, wrinkles, folds, creases, shading, occlusions, textures, curvature, shadowing, etc. When the influencer 102 moves their arm, the surface parameters on the shirt changes because the movement and position of the arm may cause the shirt to stretch, bend, pull, etc. in different angles and directions. As a result, forces are applied to the shirt (e.g., tension, compression, bending, etc.) as the arm of the influencer moves to a different position. This results in changes to the surface parameters associated with the shirt because at each arm position, different forces are applied to the shirt. In turn, since the overlay image is overlaid onto the surface of the shirt, the changes to the surface parameters may also be reflected on the surface of the overlay image so that the overlay image appears realistic as if it was printed on the shirt.

Figures 1, 3B:
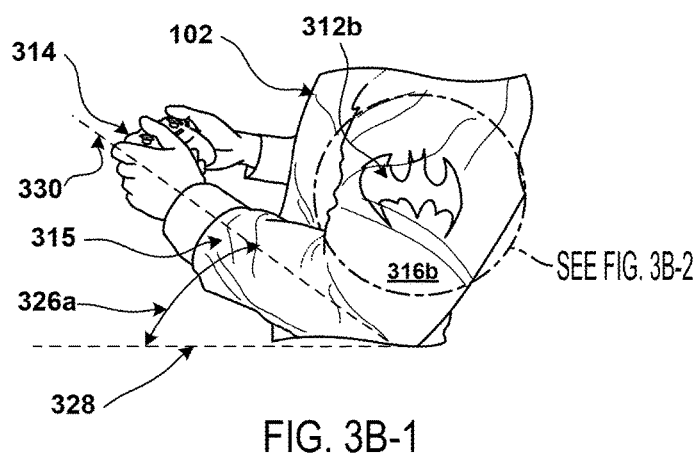
Figures 2, 3B:
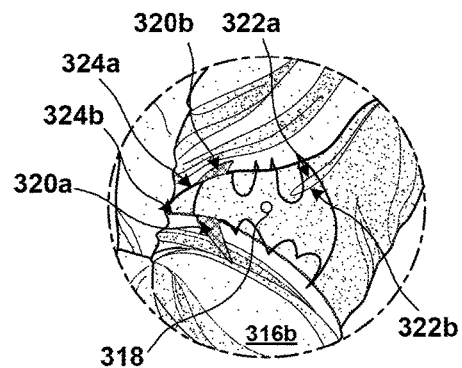

In one embodiment, as shown in FIG. 3B-1, the figure illustrates a "batman" overlay image 312*b* that has been generated onto a shirt of the influencer 102. As shown, the overlay image 312*b* appears realistic as if the overlay image 312*b* is integrated onto the shirt. The figure further illustrates the influencer 102 holding a controller 314 with their arms 315 extended and pointed in an upward direction. An arm angle 326*a* is the angle formed between a reference line 328 and an arm reference line 330. Generally speaking, the reference line 328 is generally fixed because the reference line 328 is parallel with a surface that the influencer is standing on. Accordingly, the arm angle 326*a* can dynamically change as the influencer moves the position of their arm 315.

Referring to FIG. 3B-2, the figure illustrates an enlarged view of the overlay image 312*b* shown in FIG. 3B-1 with its corresponding surface parameters 316*b*. As noted, the shirt of the influencer may include various surface parameters for a given position of the influencer's arm. Accordingly, the overlay image 312*b* includes various surface parameters 316*b* such as texture 318, 3D surface contours 320*a*-320*b*, wrinkles 322*a*-322*b*, and folds 324*a*-324*b*. When an overlay image is generated onto a shirt, the physical characteristics of the fabric of the shirt can be incorporated on the overlay image so that the overlay image appears more realistic. For example, the influencer's shirt can be made from a variety of fabrics such as cotton, silk, wool, tweed, etc. Each type of fabric may have a unique type of surface texture (e.g., soft, smooth, rough, etc.) that is visually and physically distinguishable. As shown in the FIG. 3B-2, the overlay image 312*b* includes a texture 318 which is similar to the texture of the influencer's shirt. Since the texture of the shirt is incorporated onto the overlay image, the overlay image appears more realistic.

In another embodiment, the shirt of the influencer may include various 3D surface contours. To further enhance the features of the overlay image 312b so that it appears more realistic, the overlay image 312b may include 3D surface contours 320a-320b which also appear in various areas on the influencer's shirt as a result of various forces being applied on the shirt. In some embodiments, the 3D surface contours 320a-320b may be elevated in a direction away from the surface of the influencer's arm and protrude in various directions in a three-dimensional space. The 3D surface contours may be the result of loose fabric that protrudes outward because the base of the 3D surface contour is creased or folded.

In another embodiment, the shirt of the influencer may include a plurality of wrinkles 322a-322b. The wrinkles may appear on the shirt because the fabric of the shirt may be susceptible to wrinkles, and various environmental conditions (e.g., moisture and temperature) may cause the wrinkles the form. As shown in the FIG. 3B-2, wrinkles 322a-322b begin at an upper portion of the figure and extend into a portion of the overlay image 312b. In another embodiment, the shirt of the influencer may include folds 324a-324b. In some embodiments, the folds 324a-324b may be caused by loose fabric and various forces may cause the fabric to fold. For example, when the influencer 102 bends their arms, the material on the inside is compressed and it causes folds to appear on the outside of the shirt. As illustrated in the FIG. 3B-2, the folds 324a-324b begins at a portion outside of the overlay image 312b and extends naturally into a portion of the overlay image 312b.

Figures 1, 3C:
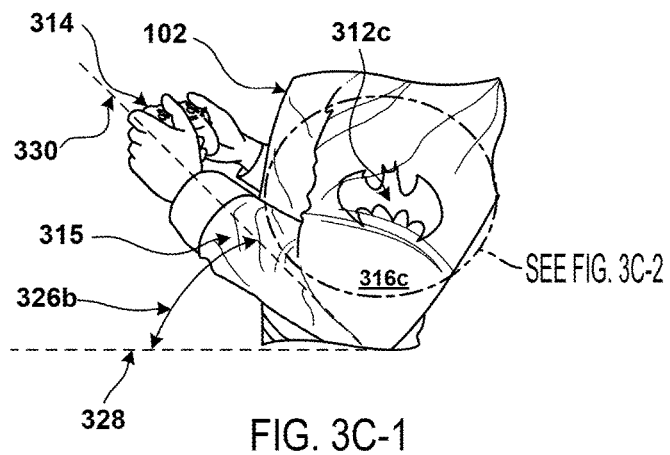
Figures 2, 3C:
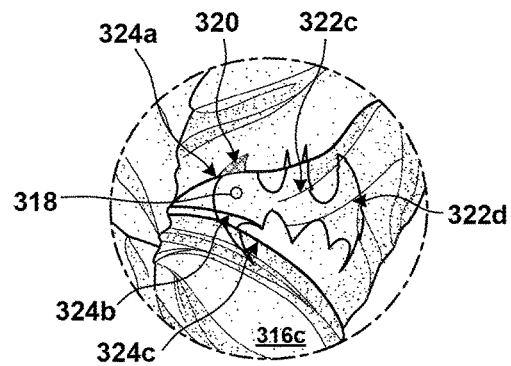

In another embodiment, FIG. 3C-1 illustrates an alternative arm position of the influence 102 with the "batman" overlay image 312c generated onto a shirt of the influencer 102. As illustrated, the influencer 102 is shown holding a controller 314 with their arms 315 extended and pointed in an upward direction. The arm angle 326b is the angle formed between a reference line 328 and an arm reference line 330. Generally, the arm angle 326b in the embodiment illustrated in FIG. 3C-1 is larger than the arm angle 326a in FIG. 3B-1. Accordingly, the surface parameters 316c for the embodiment in FIG. 3C-1 may be different than the surface parameters 316b in in FIG. 3B-1 because the influencer's arm 315 is set at different position and angle.

Referring to FIG. 3C-2, the figure illustrates an enlarged view of the overlay image 312c shown in FIG. 3C-1 with its corresponding surface parameters 316c. As noted above, when the arm of the influencer is moves to a new position, the shirt may stretch, bend, pull, etc. in various angles and directions. As a result, different forces are applied to the shirt and new surface parameters 316c can form. As shown in FIG. 3C-2, with an increase in the arm angle of the influencer, e.g., arm angle 326b, this results in an overlay image 312c having surface parameters 316c that includes texture 318, 3D surface contour 320, wrinkles 322c-322d, and folds 324b-324c.

Figures 1, 3D:
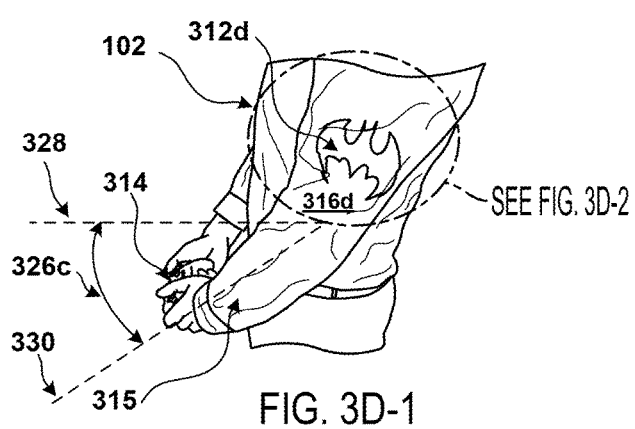
Figures 2, 3D:
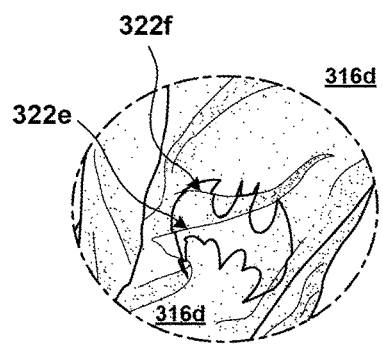

In another embodiment, FIG. 3D-1 illustrates an alternative arm position of the influence with the "batman" overlay image 312d generated onto a shirt of the influencer 102. As illustrated, the influencer 102 is shown holding a controller 314 with their arms 315 extended and pointed in a downward direction. The arm angle 326c is the angle formed between a reference line 328 and an arm reference line 330. With the influencer's arms extended downward, the forces applied to the shirt may be less than the embodiments in FIGS. 3B-1 and 3C-1 because the stretching, bending, and pulling forces applied to the shirt is not as severe when the influencer's arms are extended downward. In this position, gravitational forces can exert a downward pull on the shirt. Referring to FIG. 3D-2, the figure illustrates an enlarged view of the overlay image 312d shown in FIG. 3D-1 with its corresponding surface parameters 316d. As shown in the 3D-2, when the influencer's arms are extended downward, this may result in the overlay image 312d having surface parameters 316d that includes only texture 318 and wrinkles 322e-322f.

Figure 4A:
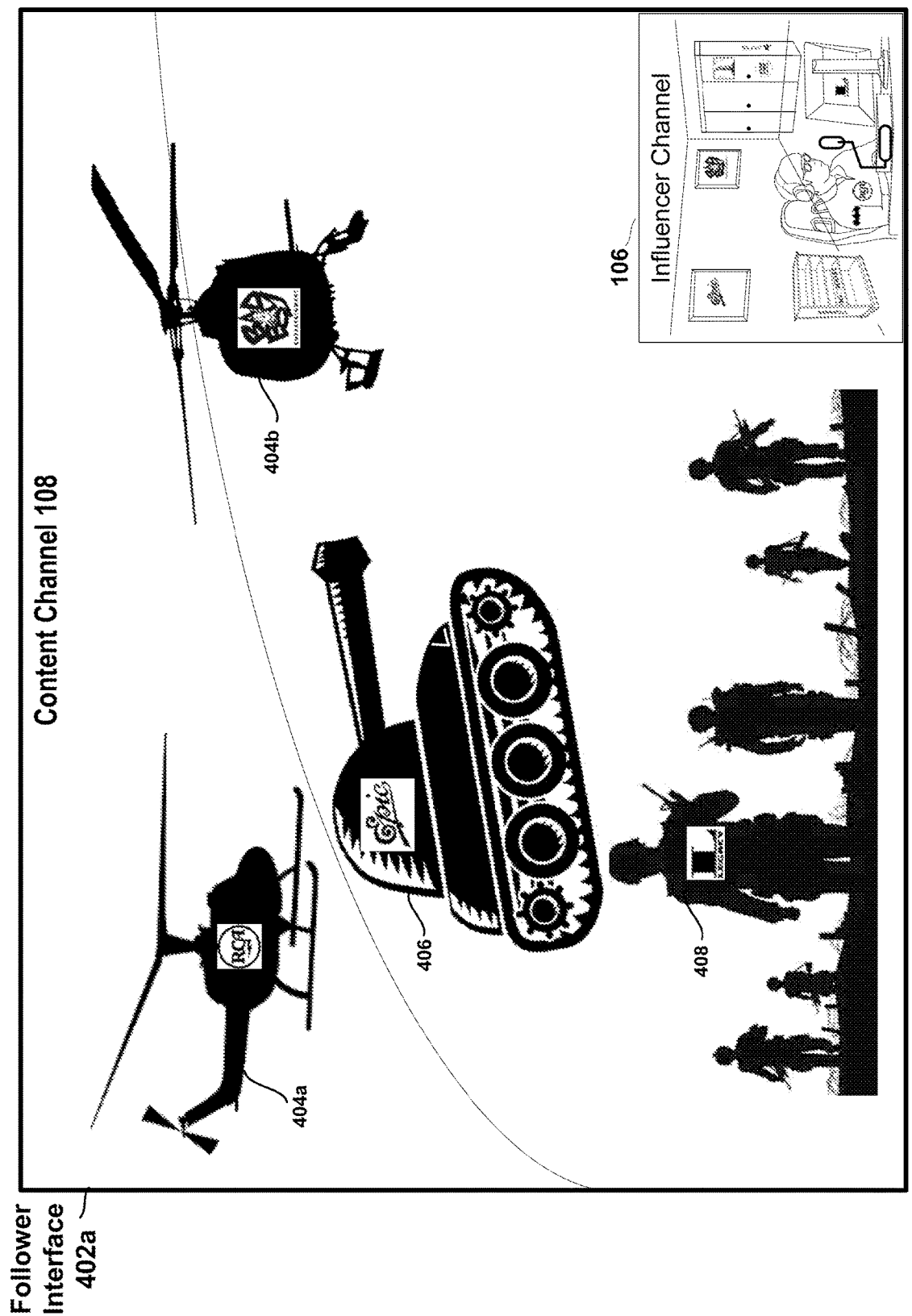
FIG. 4A illustrates an embodiment of a follower interface which provides a view from the perspective of a follower when the follower is connected to the influencer channel, in accordance with an implementation of the disclosure.

FIG. 4A illustrates an embodiment of a follower interface 402a which provides a view from the perspective of the follower 110 when the follower 110 is connected to the influencer channel 106. As illustrated, the follower interface 402a includes a view of the content channel 108 and the influencer channel 106 stitched together. In one embodiment, the view of the content channel 108 is larger than the influencer channel 106 because the followers 110 have a greater interest in the content displayed in the content channel 108. As noted above, the influencer 102 can connect to view a player's 114 content on the content channel 108. In the example shown in FIG. 4A, the content channel 108 illustrates a gameplay of the player 114 playing a game involving soldiers in war battle. During the gameplay, the followers 110 may also have a view of the influencer channel 106 which allows the followers 110 to view and listen to the influencer 102 commentating on the player's 114 gameplay as the game progresses.

FIG. 4A further illustrates a plurality of overlay images generated onto various objects in the content channel 108 and the influencer channel 106. The overlay images can be generated onto various surfaces and content associated with objects in the environment 104 of the influencer 102, environment of the player 114, and the environment of the content channel 108. The system may designate various surfaces and content associated with objects in the respective environments as markers so that overlay images can be generated onto the marker location. For example, as illustrated in FIG. 4A, the content channel 108 of the player 114 includes a gameplay scene which includes helicopters 404a-404b, tank 406, and soldier 408. As shown, the overlay images representing "RCA Records" and "Bad Boy Records" are generated onto a surface area associated with helicopters 404a and 404b where markers were designated. The overlay image representing "Epic Records" is generated onto a surface area associated with the tank 406 where a marker was designated. Overlay image representing "Legacy Recordings" is generated onto a surface area of soldier 408 where a virtual maker was designated.

Figure 4B:
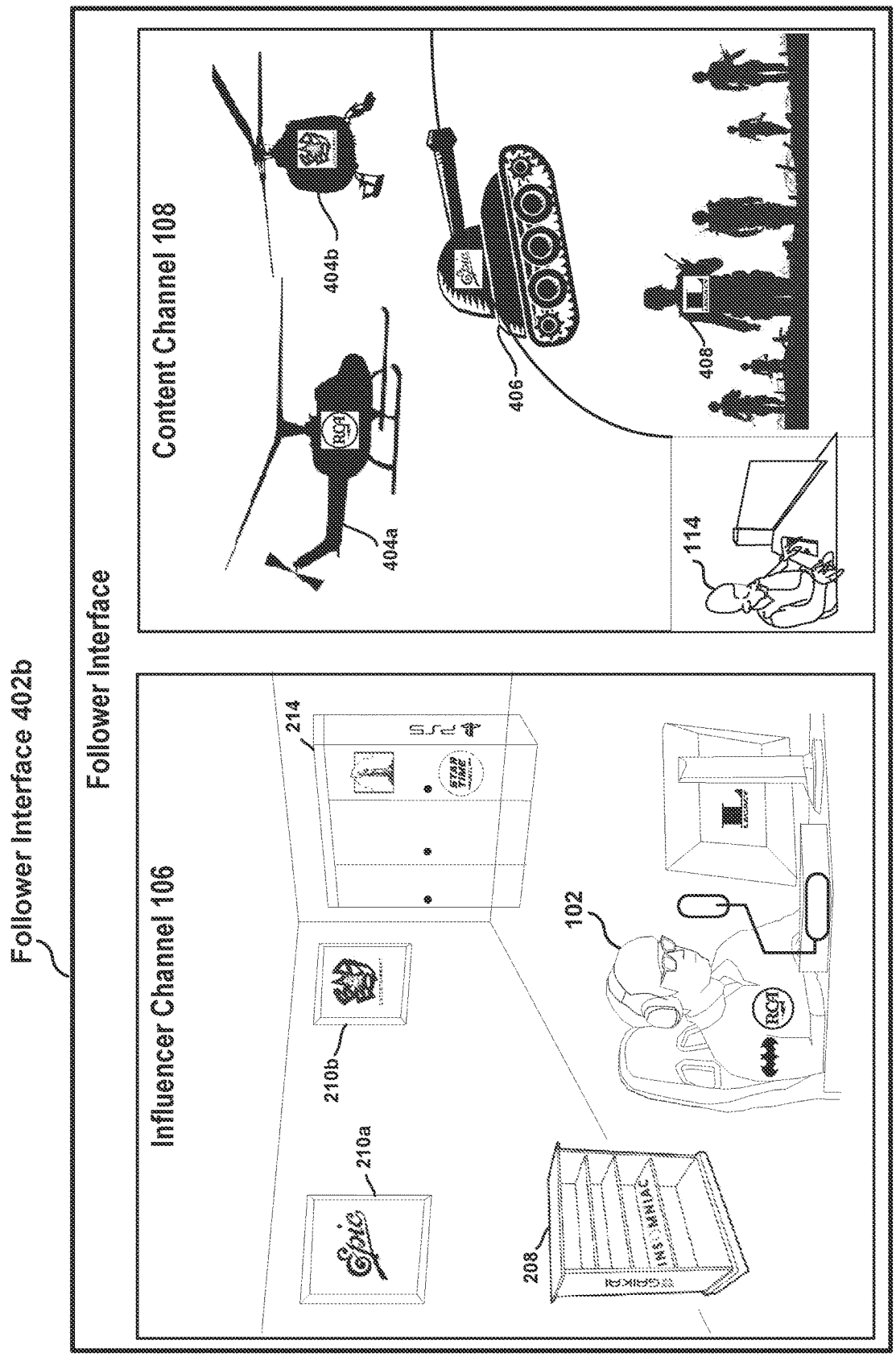
FIG. 4B illustrates an embodiment of a follower interface which provides a view from the perspective of a follower when the follower is connected to the influencer, in accordance with an implementation of the disclosure.

FIG. 4B illustrates an embodiment of a follower interface 402b which provides a view from the perspective of the follower 110 when the follower 110 is connected to the influencer channel 106. As illustrated, the follower interface 402b includes a view of the content on the influencer channel 106 and the content on the content channel 108. In one embodiment, the view of the influencer channel 106 and the content channel 108 can be configured to be substantially the same size. FIG. 4B further illustrates a plurality of overlay images that have been generated onto various objects in the environment of the influencer 102 and the environment of the content channel 108. For example, referring to the influencer channel 106, the figure illustrates the overlay images representing "Epic Records" and "Bad Boy Records" generated onto a surface area associated with picture frames 210a and 210b, respectively. The overlay images representing "Columbia Pictures Industries," "Startime International" and "PlayStation 5" are generated onto a surface area associated with the closet 214. The overlay images representing "Gaikai" and 'Insomniac Games, Inc." are generated onto a surface area associated the bookshelf 208. The overlay images representing "batman" and "RCA Records" are generated onto the shirt of the influencer 102. Referring to the content channel 108, the overlay images representing "RCA Records" and "Bad Boy Records" are generated onto a surface area associated with helicopters 404a and 404b. The overlay image representing "Epic Records" is generated onto a surface area associated with tank 406. The overlay image representing "Legacy Recordings" is generated onto a surface area associated with the soldier 408.

Figure 4C:
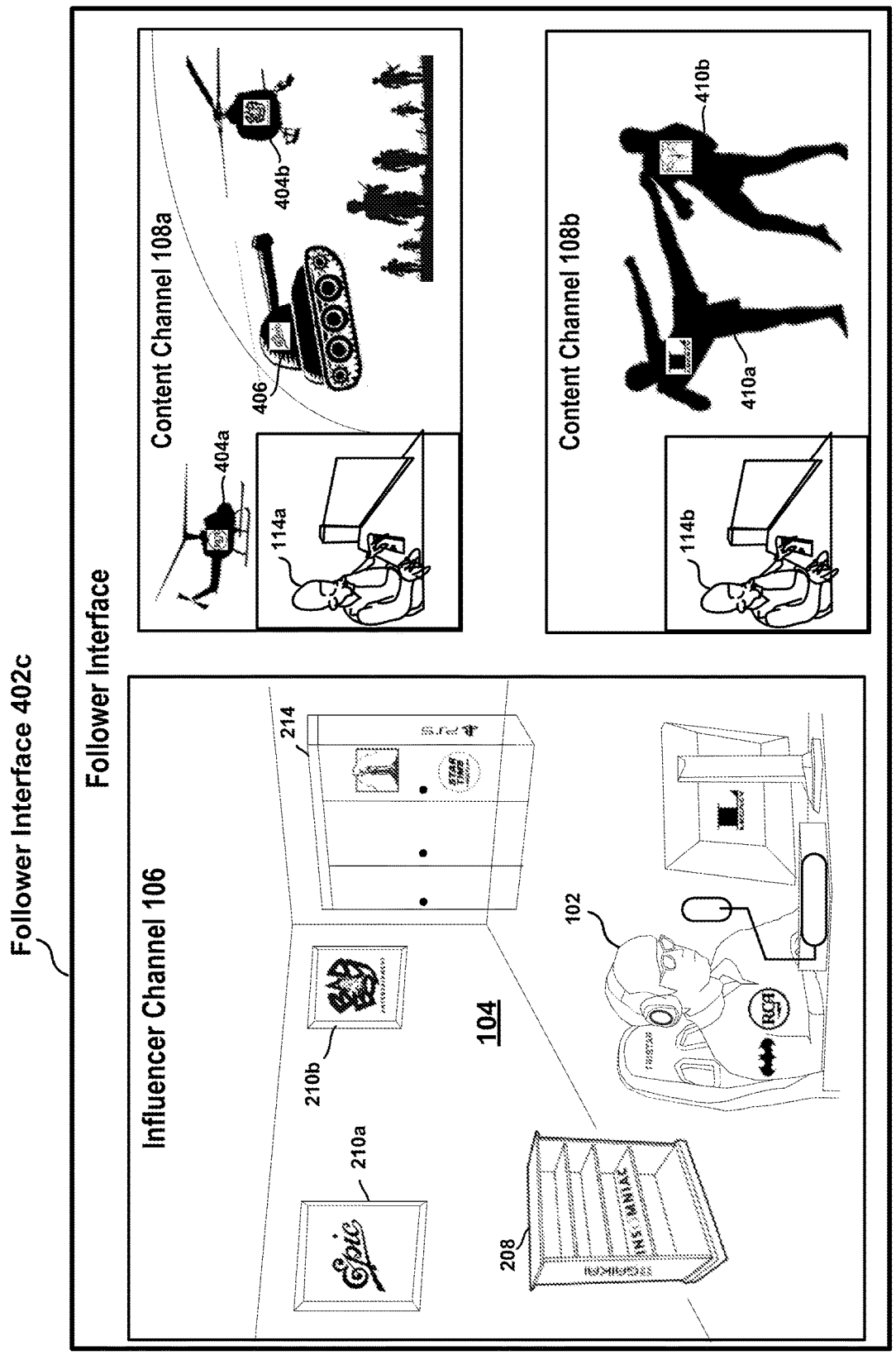
FIG. 4C illustrates an embodiment of a follower interface which provides a view from the perspective of a follower when the follower is connected to the influencer channel, in accordance with an implementation of the disclosure.

FIG. 4C illustrates an embodiment of a follower interface 402c which provides a view from the perspective of the follower 110 when the follower 110 is connected to the influencer channel 106. As illustrated, the follower interface 402b includes a view of the influencer channel 106, content channel 108a, and content channel 108b. In one embodiment, the influencer 102 can simultaneously connect to multiple content channels, e.g., content channels 108a-108b. For example, as illustrated in FIG. 4C, the influencer 102 is connected to and viewing content channel 108a and content channel 108b. Content channel 108a illustrates the gameplay of player 114a playing a war game involving soldiers. Content channel 108b illustrates the gameplay of player 114b playing a kickboxing game. Since the influencer 102 is viewing the content from content channels 108a and 108b, the influencer 102 can provide commentary on both content channels as both games are being played. As noted above, a plurality of overlay images can be generated onto various objects located in the influencer channel 106 and the content channel 108. Referring to the content channel 108b, overlay images representing "Legacy Recordings" and "TriStar Pictures" are generated onto a surface area associated with a first kickboxer 410 and a second kickboxer, respectively.

Figure 5:
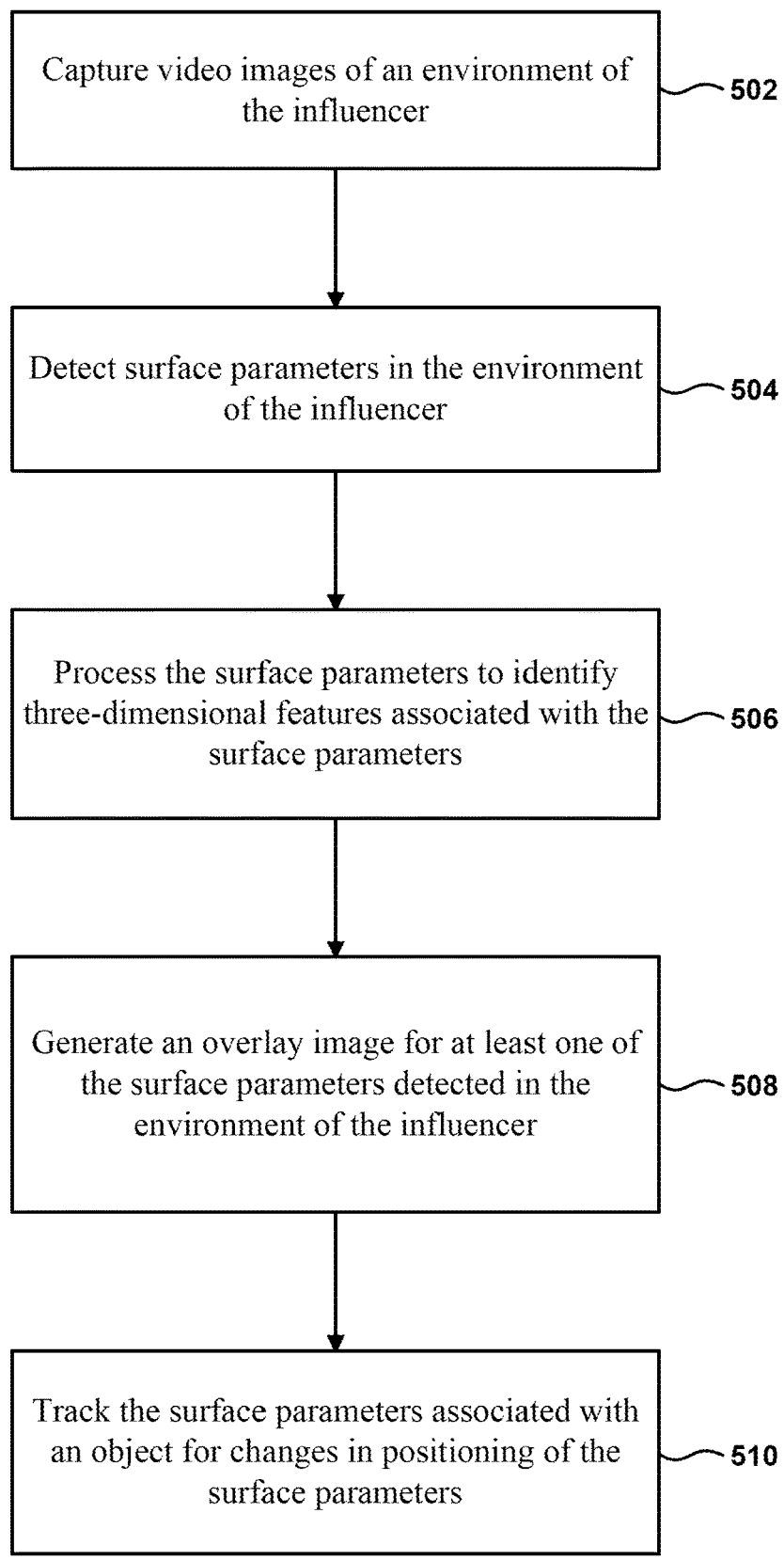
FIG. 5 illustrates an embodiment of a method for generating a video stream for followers of an influencer during a session by generating overlay images for at least one surface parameter in the environment of the influencer, in accordance with an implementation of the disclosure.

FIG. 5 illustrates an embodiment of a method for generating a video stream for followers of an influencer during a session by generating overlay images for at least one surface parameter in the environment of the influencer. In one embodiment, the method includes an operation 502 that captures video images of an environment 104 of an influencer 102 and the influencer 102 viewing an online content channel 108. As noted above, cameras 122a-122n can be used to record the influencer 102 in their environment 104 when the influencer 102 creates content (e.g., reaction videos, product reviews, product endorsements, comedy skits etc.) for the influencer channel 106. The cameras 122a-122n can be positioned at different areas within the environment 104 to capture a unique perspective so that the followers 110 can have different viewpoints of the influencer 102 and the environment 104. In one embodiment, the cameras 122a-122n can be an RGB-Depth sensing camera which includes depth sensing so that 3D models can be created. The RGB-Depth sensing camera can provide both color and dense depth images which can facilitate 3D mapping of the captured images.

The method flows to operation 504 where the operation is configured to detect surface parameters in the environment 104 of the influencer 102. In one embodiment, the operation 504 is configured to scan the video images captured by the plurality of cameras 116 and detect various surfaces and surface parameters associated with the objects in the environment 104 of the influencer 102. The surface parameters may include various associated three-dimensional features such as surface contours, wrinkles, folds, creases, shading, occlusions, textures, curvature, shadowing, etc. In some embodiments, the identified surfaces associated with the objects can be designated as markers so that overlay images can be generated at the marker location.

In other embodiments, the markers may be physically anchored or embedded in real-world objects such as clothing worn by the influencer and/or various objects in the environment 104 of the influencer 102. In some embodiments, the markers can be virtual markers. For example, virtual markers can be any anything in the video image that is recognizable and distinguishable from frame-to-frame, e.g., buttons on a shirt. As the influencer moves around, the shirt button is continuously tracked and can be detected at any point in time. In some embodiments, a machine learning model that is trained to identify various real-world objects and various features on a human body. For example, the machine learning model can differentiate between the front and back of a person. Accordingly, the machine learning model can help determine whether the marker is located on the back of a person's shirt or the front of the shirt.

The method flows to operation 506 where the operation is configured to process the surface parameters to identify three-dimensional features associated with the surface parameters. As noted above, the surface parameters associated with an object may include various three-dimensional features such as surface contours, wrinkles, folds, creases, shading, occlusions, textures, curvature, shadowing, etc. For example, the system detects a bookshelf in the environment of the influencer and processes the surface parameters of the bookshelf to identify three-dimensional features which results in a flat surface area and coarse texture. In another example, the system detects that the influencer is wearing a wool sweater. The wool sweater may be loose fitting and designed to fit the influencer comfortably. Because the sweater is loose fitting, the surface parameters associated with an area of the wool sweater includes multiple folds, curvatures, and surface contours. In some embodiments, other factors may affect the three-dimensional features associated with the surface parameters of clothing worn by the influencer. These factors may include the fabric type, fit (e.g., loose, normal, slim), body position and movements of the influencer, etc.

In some embodiments, operation 506 is configured to process the surface parameters to extract depth data from the three-dimensional features. In one embodiment, the depth data may include three-dimensional features which can be used to generate a wire frame model of an object in the environment that is associated with the surface parameters being processed. In one embodiment, operation 506 may include one or more machine learning operations to help predict the depth data when the depth data is unavailable.

At operation 508, the operation is configured to generate an overlay image for at least one of the surface parameters detected in the environment of the influencer. In some embodiments, the overlay image is configured for dynamic contouring to the identified three-dimensional features so that the overlay image can appear realistic as if it was originally printed or embroidered on the object. For example, the influencer 102 may be wearing a knit beanie which includes multiple folds, wrinkles, creases, and occlusions. When an overlay image is generated onto the surface of the knit beanie, the overlay image is dynamically contoured to the various folds, wrinkles, creases, and occlusions associated with the knit beanie. When generating the overlay image, the depth and various three-dimensional features of the knit beanie is incorporated onto the overlay image, thus, enhancing the realistic appearance of the overlay image.

In some embodiments, operation 508 is configured to process the overlay image to enable the dynamic contouring of the identified three-dimensional features. Operation 508 may include one or more machine learning operations to help approximate object geometry and surface parameters that are not visible so that the overlay image can be generated for the surface parameters. In one embodiment, during a session, operation 508 is configured to adjust a shape of the overlay image to follow changes in the surface parameters of the object and geometric viewing angles of the surface parameters. For example, as the surface parameters associated with a shirt of the influencer changes during a session, operation 508 can adjust a shape of the overlay image (e.g., batman logo) to adjust for the changes to the surface parameters.

In some embodiments, to further enhance the realistic appearance of the overlay image, the overlay image is dynamically contoured to adjust lighting parameters and shadowing parameters of the overlay image based on viewable changes in the surface parameters of the object during the session. For example, if a light source is directed from a direction behind the influencer's shoulders, an overlay image that is applied to the front portion of the influencer's shirt may include shadows or appear darker because the overlay image does not directly face the light source. Without some type of shadowing that is applied to the overlay image or other regions where shadows are expected to appear, the overlay image may look too artificial and unrealistic.

In another embodiment, overlay image can be selected based on a profile of the follower so that the video stream received by the follower when viewing the influencer channel 106 is customized based on the profile of the follower. In one embodiment, the overlay images may be selected using an Artificial Intelligence (AI) Module that is configured to receive data from the influencer channel 106, data from the content channel 108, and profile data of the follower 110 as inputs. The data from the influencer channel 106 the content channel 108 can be used to determine what the follower 110 is viewing and the context of the content. The follower profile can include various attributes associated with the follower 110 such as the follower's interests, preferences, likes, dislikes, gaming experience and skill level, etc. Using the noted inputs, the AI module implements one or more machine learning operations that predicts which overlay images to select and overlay for a given follower 110. For example, based on the profile data of the followers 110, the AI Module can determine that 75% of the followers 110 who are presently connected to the influencer channel 106 are logging in from Japan. Based on the profile data and other factors such as what is currently popular in Japanese culture, follower demographics, time of day, etc. the AI module can may a prediction on the type of overlay images the followers 110 might have an interest in.

In some embodiments, the overlay image can be changed based on changes in the followers 110 and/or engagement associated with the content on the influencer channel 106. For example, as followers connect or disconnect from viewing content because of their interest or disinterest in the content on the influencer channel 106 during a session, the overlay image can be updated to reflect the changes in the followers.

In accordance with another embodiment, the method flows to operation 510 where the operation is configured to track the surface parameters associated with an object for changes in positioning of the surface parameters. In some embodiments, operation 510 is configured to track the position and orientation of the surface parameters of an object so that the wire frame model can be updated during the session. This allows the system to know the location of the surface parameters at any given point in time. For example, as the influencer moves or naturally changes positions, the system can generate an overlay image onto the location that is consistent with the scene. For example, an upper sleeve of an influencer's shirt can be designated as a marker location. The surface parameters associated with the location of the marker may include various three-dimensional features such as wrinkles, creases, folds, and surface contours at an initial point in time (e.g., time t0). At a later point in time (e.g., time t10), the influencer moves their arm to a different position which in turn can cause various changes to the three-dimensional features associated surface parameters. Accordingly, at time t10, the position and the three-dimensional features associated and the surface parameters (e.g., wrinkles, creases, folds, and surface contours) may be different than it was at time t0. As a result, as the objects in the environment changes positions, the system can track the position of the surface parameters so that an overlay image can be generated at the appropriate location while taking into consideration the changes to the three-dimensional features associated with the surface parameters.

Figure 6:
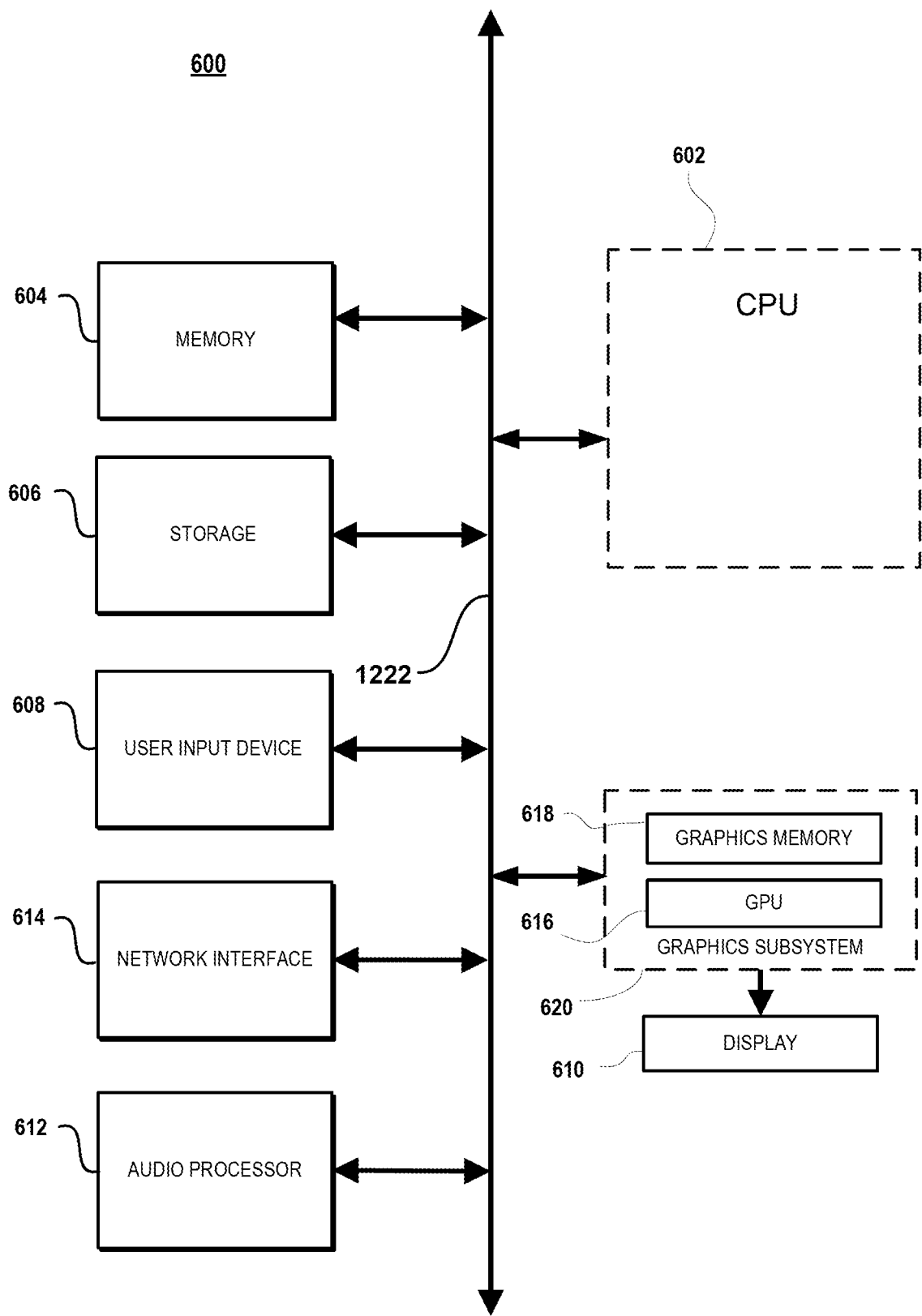
FIG. 6 illustrates components of an example device 600 that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for generating a video stream for followers of an influencer during a session, comprising:
    capturing video images of an environment of the influencer, wherein the environment includes the influencer viewing an online content channel;
    detecting surface parameters in the environment;
    processing the surface parameters to identify three-dimensional features associated with the surface parameters;
    identifying a follower that is viewing the influencer;
    generating an overlay image for at least one of the surface parameters, the overlay image is configured for dynamic contouring to the identified three-dimensional features during the session, wherein the overlay image is selected based on a profile of the follower so that the video stream received by the follower when viewing the influencer is customized based on the profile of the follower;
    wherein the surface parameters are processed to extract depth data from the three-dimensional features, the depth data used to generate a wire frame model of an object in the environment that is associated with the surface parameters being processed;
    tracking the object to update the wire frame model during the session; and
    processing the overlay image to enable said dynamic contouring of the identified three-dimensional features.

2. The method of claim 1, further comprising,
    identifying additional followers of the influencer during the session, and for each additional follow generating an additional overlay image that is dynamically contoured to the identified three-dimensional features during the session.

3. The method of claim 2, wherein each said additional follower is provided with said video stream that is customized based on a respective profile of the additional follower.

4. The method of claim 3, wherein each said additional follower and the follower receive said video stream with different ones of said overlay image or additional overlay image.

5. The method of claim 1, wherein said identifying of the follower includes identifying one or more additional followers, and the overlay image that is selected is additionally based on a combination of the profile of the follower and profiles of the one or more additional followers, such that each of the follower and the additional followers receive a same one of said overlay image in the video stream.

6. The method of claim 5, wherein the video stream and said overlay image is customized a group that includes the follower and the one or more additional followers.

7. The method of claim 1, wherein said dynamic contouring is configured to adjust a shape of the overlay image to follow changes in the surface parameters of the object during the session, wherein the object in the environment is associated with images of the influencer.

8. The method of claim 1, wherein said dynamic contouring is configured to occlude one or more parts of the overlay image based on viewable changes in the surface parameters of the object during the session, wherein the object in the environment is associated with images of the influencer.

9. The method of claim 1, wherein said dynamic contouring is configured to adjust lighting parameters of the overlay image based on viewable changes in the surface parameters of the object during the session, wherein the object in the environment is associated with images of the influencer.

10. The method of claim 1, wherein said dynamic contouring is configured to adjust a shape of the overlay image to follow geometric viewing angles of the surface parameters of the object during the session, wherein the object in the environment is associated with real-world objects in the environment of the influencer.

11. A method for generating a video stream for followers of an influencer during a session, comprising:
    capturing video images of an environment of the influencer, wherein the environment includes the influencer viewing an online content channel;
    detecting surface parameters in the environment;
    processing the surface parameters to identify three-dimensional features associated with the surface parameters;
    identifying a plurality of followers that are viewing the influencer;
    generating an overlay image for at least one of the surface parameters, the overlay is selected based on information identified in profiles of the plurality of followers;
    wherein the video stream received by the followers is customized during the session;
    wherein the surface parameters are processed to extract depth data from the three-dimensional features, the depth data used to generate a wire frame model of an object in the environment that is associated with the surface parameters being processed;
    tracking the object to update the wire frame model during the session.

12. The method of claim 11, further comprising,
    changing the overlay image based on changes in said followers.

13. The method of claim 12, wherein the changes in said followers includes one or more followers stopping said viewing of the influencer or one or more followers joining the viewing of the influencer.

14. The method of claim 12, wherein said changes in said followers further includes changes in engagement in said viewing of the influencer.

15. A non-transitory computer-readable storage medium storing a computer program, the computer-readable storage medium comprising:
    program instructions for capturing video images of an environment of an influencer, wherein the environment includes the influencer viewing an online content channel;
    program instructions for detecting surface parameters in the environment;
    program instructions for processing the surface parameters to identify three-dimensional features associated with the surface parameters;
    program instructions for identifying a follower that is viewing the influencer;
    program instructions for generating an overlay image for at least one of the surface parameters, the overlay image is configured for dynamic contouring to the identified three-dimensional features during a session, wherein the overlay image is selected based on a profile of the follower so that a video stream received by the follower when viewing the influencer is customized based on the profile of the follower;
    wherein the surface parameters are processed to extract depth data from the three-dimensional features, the depth data used to generate a wire frame model of an object in the environment that is associated with the surface parameters being processed;
    tracking the object to update the wire frame model during the session; and
    processing the overlay image to enable said dynamic contouring of the identified three-dimensional features.

16. The storage medium as recited in claim 15, wherein the three-dimensional features include one or more surface contours, or wrinkles, or folds, or creases, or shading, or occlusions, or textures, or curvature, or shadowing.

17. The storage medium as recited in claim 15, further including:
    program instructions for identifying additional followers of the influencer during the session, and for each additional follow generating an additional overlay image that is dynamically contoured to the identified three-dimensional features during the session.

18. The storage medium as recited in claim 15, wherein said identifying of the follower includes identifying one or more additional followers, and the overlay image that is selected is additionally based on a combination of the profile of the follower and profiles of the one or more additional followers, such that each of the follower and the additional followers receive a same one of said overlay image in the video stream.

19. The storage medium as recited in claim 15, wherein said dynamic contouring is configured to adjust a shape of the overlay image to follow changes in the surface parameters of the object during the session, wherein the object in the environment is associated with images of the influencer.

* * * * *